May 28, 1957 F. GLAESER 2,793,906

SPRING-HINGED VENTILATING SIDE WINDOW FOR AUTOMOBILES

Filed April 7, 1954

Inventor
Friedrich Glaeser
By
Attorney

United States Patent Office 2,793,906
Patented May 28, 1957

2,793,906
SPRING-HINGED VENTILATING SIDE WINDOW FOR AUTOMOBILES

Friedrich Glaeser, Mainz-Gonsenheim, Germany, assignor to General Motors Corporation, Detroit, Mich., a corporation of Delaware Application April 7, 1954, Serial No. 421,638

Claims priority, application Germany April 11, 1953

1 Claim. (Cl. 296—44)

This invention relates to windows for automobiles, and particularly to side windows for automobiles.

One arrangement for small side windows on automobiles is to have the window vertically hinged, or hinged at a small angle to the vertical, and capable of a small angular movement about the axis of the hinges so as to ventilate the automobile.

It is usual for the hinges to be at the leading edge of the window and such hinges allow rain and draughts to pass through between the leading edge of the window and the supporting body member.

An object of the invention is to provide a flexible hinge which is absolutely watertight, is inexpensive to produce, and allows the required small angle of movement.

This object is achieved, according to the invention, by use of a leaf spring bent to a small angle so as to form two limbs, one limb being attached to the window, and the other limb being attached to a support member such as a door pillar.

Alternatively one limb of the spring can be attached to a frame which carries the side window.

The nature and advantage of the invention and the manner in which the object of the invention is accomplished will be more clearly apparent to those skilled in the art from the succeeding detailed description of a preferred embodiment of the invention, and the accompanying drawings, in which:—

Figure 1:
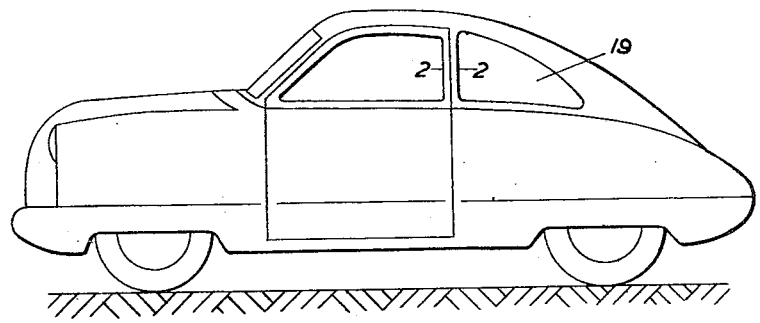
Fig. 1 is a side elevation of a motor vehicle embodying the invention.
Figure 2:
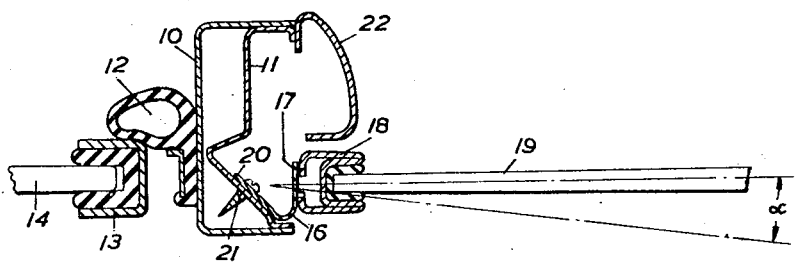
Fig. 2 is a section on line 2—2 of Fig. 1.

In Fig. 1 of the drawings is shown an automobile having a small side window 19 which is hinged to the central door pillar and can be swivelled through a small angle and in Fig. 2 the side window 19 is shown in its closed position and it can be opened to dash-dot line position.

The door pillar comprises two pressed portions 10 and 11 welded together. One pressed portion 10 supports a rubber packing 12 forming a stop for the frame 13 of the front window 14.

A leaf spring 16 is bent to form two limbs 17 and 20, one limb 20 being attached by bolts 21 to one of the pressed portions 11. Welded to the other limb 17 of the spring 16 is a frame 18 of a small side window 19. Secured at the junction of the pressed portions 10 and 11 by adhesive is a trim strip 22.

The side window 19 is operable by a toggle lever, not shown, so that the side window can be turned outwards through an angle and which can be say 4–8° within which the bending stresses of the spring 16 remain within predetermined permissible limits.

The spring 16 extends the full height of the forward edge of the window 19 and assures that there are no spaces for the entry of draughts or rain.

The means for holding open the window form no part of the present invention, it is conceivable that the window can be supported by the spring 16 and merely pushed open by hand when it is desired to make a hand signal.

The description of the preferred embodiment of the invention for the purpose of illustrating the principal thereof is not to be considered as limiting the invention, since many modifications of the invention within the scope thereof can be devised by the exercise of skill in the art.

I claim:

A side window construction for an automobile comprising a door pillar consisting of two vertical pressings, a side window in a frame, a leaf spring substantially the height of the window frame, the leaf spring being bent at an angle into a V-shaped configuration in transverse section to form two limbs defining an acute angle, the web of said V-shaped configuration defining a continuous curved radius, one limb being attached to one pressing of the door pillar, and the other limb being welded to the vertical leading edge of the window frame, whereby hinge action of said window results solely from flexing of the curved radius of said spring through a relatively small angle.

References Cited in the file of this patent
UNITED STATES PATENTS

| 2,034,982 | Henderson | Mar. 24, 1936 |
| 2,110,337 | Marshall | Mar. 8, 1938 |
| 2,260,133 | Ball | Oct. 21, 1941 |
| 2,507,965 | Eichner | May 16, 1950 |

FOREIGN PATENTS

| 809,436 | France | Dec. 12, 1936 |
| 858,507 | Germany | Dec. 8, 1952 |